US009557523B2

(12) United States Patent
Suda

(10) Patent No.: US 9,557,523 B2
(45) Date of Patent: Jan. 31, 2017

(54) FOCUSING METHOD, FOCUSING APPARATUS, EXPOSURE METHOD, AND DEVICE MANUFACTURING METHOD

(71) Applicant: CANON KABUSHIKI KAISHA, Tokyo (JP)

(72) Inventor: Hiromi Suda, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 99 days.

(21) Appl. No.: 14/293,043

(22) Filed: Jun. 2, 2014

(65) Prior Publication Data
US 2014/0354968 A1 Dec. 4, 2014

(30) Foreign Application Priority Data

Jun. 4, 2013 (JP) ................. 2013-118306

(51) Int. Cl.
| | |
|---|---|
| G03B 27/68 | (2006.01) |
| G02B 7/28 | (2006.01) |
| G02B 7/32 | (2006.01) |
| G02B 21/00 | (2006.01) |

(52) U.S. Cl.
CPC ............. G02B 7/28 (2013.01); G02B 7/285 (2013.01); G02B 7/32 (2013.01); G02B 21/0016 (2013.01)

(58) Field of Classification Search
CPC ....... G02B 7/28; G02B 21/0016; G02B 7/285; G02B 7/32; G03F 7/70191
See application file for complete search history.

(56) References Cited

U.S. PATENT DOCUMENTS

| | | | | |
|---|---|---|---|---|
| 4,770,532 A | * | 9/1988 | Ito ................. | G01B 11/0608 356/625 |
| 5,130,213 A | * | 7/1992 | Berger ............ | B82Y 10/00 250/492.2 |
| 5,502,311 A | * | 3/1996 | Imai ............... | G03F 7/70858 250/548 |
| 5,510,892 A | * | 4/1996 | Mizutani ........ | G01B 11/26 250/559.37 |
| 5,985,495 A | * | 11/1999 | Okumura ....... | G03F 7/2002 430/22 |
| 6,236,447 B1 | * | 5/2001 | Yamada .......... | G03F 9/7034 355/53 |

(Continued)

FOREIGN PATENT DOCUMENTS

JP   04-354320 A   12/1992

*Primary Examiner* — Deoram Persaud
(74) *Attorney, Agent, or Firm* — Rossi, Kimms & McDowell LLP

(57) ABSTRACT

A target object has an upper surface including a first surface and a second surface located below the first surface. A method of focusing an optical system includes: measuring a surface position of the first surface; measuring a surface position of the second surface; obtaining, based on a measurement results of the surface position of the first surface, an in-focus condition in which the optical system is focused on the first surface; obtaining information about a step amount between the first surface and the second surface based on the measurement results of the surface positions of the first surface and the second surface; and focusing the optical system on the second surface based on the in-focus condition and the information about the step amount.

18 Claims, 7 Drawing Sheets

(56) References Cited

U.S. PATENT DOCUMENTS

| | | | |
|---|---|---|---|
| 6,657,216 B1 * | 12/2003 | Poris | G01B 11/0608 250/216 |
| 2004/0227921 A1 * | 11/2004 | Sato | G03F 7/705 355/69 |
| 2007/0046953 A1 * | 3/2007 | De Groot | G01B 11/0675 356/512 |
| 2009/0303495 A1 * | 12/2009 | Courteville | G01B 11/0608 356/625 |
| 2011/0045613 A1 * | 2/2011 | Suzuki | G03F 7/70425 438/7 |
| 2013/0234021 A1 * | 9/2013 | Sohn | H01J 37/26 250/307 |
| 2015/0356726 A1 * | 12/2015 | Fukazawa | G01N 21/956 382/149 |

\* cited by examiner

FOCUSING METHOD, FOCUSING APPARATUS, EXPOSURE METHOD, AND DEVICE MANUFACTURING METHOD

BACKGROUND OF THE INVENTION

Field of the Invention

The present invention relates to a focusing method, focusing apparatus, exposure apparatus, and device manufacturing method.

Description of the Related Art

A microdevice such as a semiconductor device or liquid crystal display device is manufactured by a photolithography method of transferring, onto a photosensitive substrate, a pattern formed on a mask. An exposure apparatus used in the photolithography process includes a mask stage which supports a mask, and a substrate stage which supports a substrate. While sequentially moving the mask stage and substrate stage, the exposure apparatus projects and transfers, onto a substrate via a projection optical system, a pattern formed on a mask. In the exposure apparatus, every time each exposure target region (shot region) on a substrate is moved to an exposure position below the projection optical system by the substrate stage, a surface position measurement device detects a shift between the focus of the projection optical system and the surface position of the substrate to correct the surface position of the substrate and focus on it.

Japanese Patent Laid-Open No. 4-354320 discloses an oblique incidence surface position measurement device which detects a surface position by irradiating a surface to be detected with a beam from an oblique direction at an angle almost parallel to the surface. The oblique incidence surface position measurement device includes a light projecting unit which is arranged on one side with respect to a projection optical system and emits a beam, and a light receiving unit which is arranged on the other side and receives reflected light of the beam reflected by the surface to be detected. The purpose of irradiation with a beam at an angle almost parallel to the surface to be detected is to accurately focus the projection optical system on the substrate surface by using only light reflected by the surface of a photoresist (photosensitive agent) applied on the substrate. If the angle with respect to the surface to be detected is large, the irradiation light is refracted, enters the photoresist, reaches an underlying oxide film layer or a layer below it, and is reflected by the layer. As a result, a surface of the substrate that is being measured becomes unclear.

When the oblique incidence surface position measurement device is used, a high-accuracy detection result can be obtained without the influence of the projection optical system, compared to, for example, a TTL (Through The Lens) surface position measurement device via the projection optical system. In the projection optical system, aberration is satisfactorily corrected for only the wavelength of exposure light. Thus, when detection light is different in wavelength from exposure light in the TTL surface position measurement device, aberrations occur. In contrast, when surface position detection light is equal in wavelength to exposure light, the photoresist applied on the substrate is undesirably exposed to light. To avoid this, an exposure apparatus for manufacturing a microdevice often employs the oblique incidence surface position measurement device.

When manufacturing a microdevice such as a MEMS, a structure is sometimes formed on a substrate having an uneven shape. When exposing the bottom of the recessed portion of the substrate in order to form a structure in the recessed portion of the substrate, if the projection optical system is focused on the bottom of the recessed portion serving as the exposure target region, detection light may be reflected by the projecting portion in the oblique incidence surface position measurement device. In this case, detection light passing through the exposure target region cannot be obtained, and the oblique incidence surface position measurement device may not be able to focus on the exposure target region. Also, when the projecting portion exists at the periphery of the exposure target region, the oblique incidence surface position measurement device may not be able to focus on the exposure target region owing to the presence of the projecting portion.

SUMMARY OF THE INVENTION

The present invention has been made in consideration of the above situation, and provides a focusing method of focusing an optical system at high accuracy even on a lower portion of the upper surface of a target object.

The present invention in its one aspect provide a method of focusing an optical system on a second surface of a target object having an upper surface including a first surface and a second surface located below the first surface, comprising: a first step of projecting light to the first surface at a first incident angle which forms a first angle with respect to a first direction parallel to an optical axis of the optical system, and receiving the light reflected by the first surface to measure a surface position of the first surface; a second step of projecting light to the second surface at a second incident angle which forms a second angle smaller than the first angle with respect to the first direction, and receiving the light reflected by the second surface to measure a surface position of the second surface; a third step of obtaining, based on a measurement result of the surface position of the first surface, an in-focus condition in which the optical system is focused on the first surface; a fourth step of obtaining information about a step amount between the first surface and the second surface based on the measurement result of the surface position of the first surface and a measurement result of the surface position of the second surface; and a fifth step of focusing the optical system on the second surface based on the in-focus condition and the information about the step amount.

Further features of the present invention will become apparent from the following description of exemplary embodiments with reference to the attached drawings.

DESCRIPTION OF THE EMBODIMENTS

Embodiments of the present invention will now be described with reference to the accompanying drawings.

First Embodiment

Figure 1:
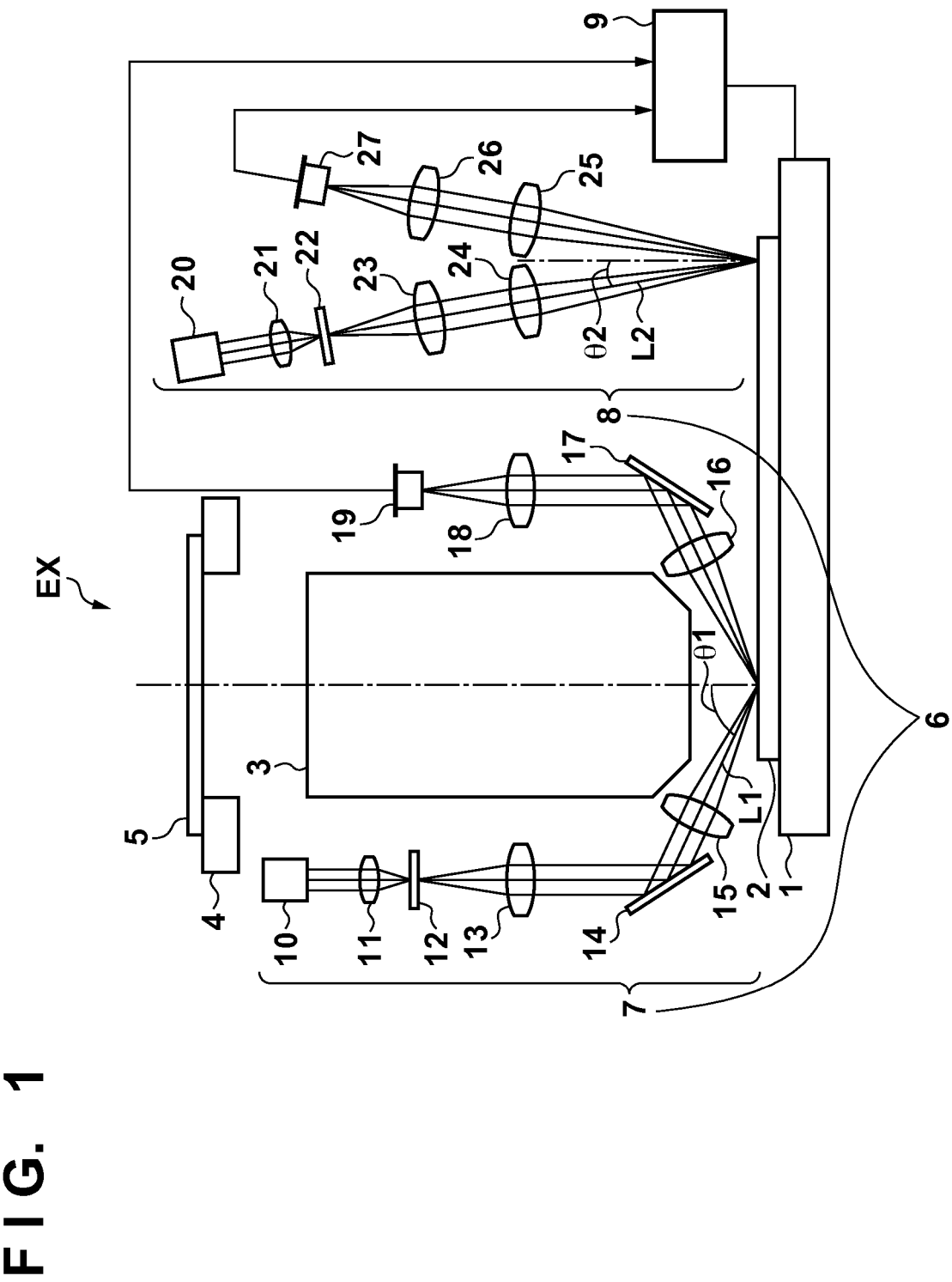
FIG. 1 is a view showing an exposure apparatus according to the first embodiment.

FIG. 1 schematically shows an outline of the overall arrangement of an exposure apparatus according to the first embodiment of the present invention. Roughly speaking, an exposure apparatus EX operates as follows. A substrate stage 1 is movable while holding a substrate 2 serving as an exposure target object. A controller 9 manages the position of the substrate stage 1, and substantially manages the relative positions of the projection region of a projection optical system (optical system) 3 and the substrate 2. The controller 9 focuses the projection optical system 3 on an exposure target region by using a surface position measurement device 6. The controller 9 and surface position measurement device 6 construct a focusing apparatus which focuses the projection optical system 3 on the substrate surface. A reticle (mask) 5 on which a pattern to be transferred onto the substrate 2 is formed is held on a reticle stage 4. An illumination optical system (not shown) illuminates the reticle 5. The projection optical system 3 projects the pattern of the illuminated reticle 5 onto the substrate 2.

The substrate 2 in the first embodiment is a substrate for manufacturing a device. The substrate 2 is, for example, a quartz substrate, a glass substrate, a silicon-containing semiconductor substrate, a multilayer substrate obtained by joining two types or more of substrates of different materials, or the like. For descriptive convenience, one surface of the substrate 2 will be called an upper surface, and the other surface will be called a lower surface Pb. A structure P1 such as a trench or via is formed in the upper surface of the substrate 2. While the projection optical system 3 is focused on a recessed portion fitted inside the structure P1, the exposure apparatus EX exposes this region. The substrate 2 sometimes includes a film pattern formed on the substrate main body. This film pattern is a building component constituting, for example, part of a device. Examples of the film pattern are a conductive film pattern serving as an electrode or wiring, a semiconductor film pattern constituting part of a switching element, and an insulating film pattern serving as a passivation film or the like. The substrate 2 sometimes includes a photosensitive film (photoresist film) formed on the substrate main body. As a film functioning during or after the device manufacturing process, the substrate 2 sometimes includes an antireflection film which prevents reflection of exposure light or the like, and a protective film (topcoat film) which protects the photosensitive film.

In the following description, the positional relationship between various building components, and the like will be explained based on the XYZ orthogonal coordinate system shown in FIG. 1. In the XYZ orthogonal coordinate system, the Z-axis direction is a direction parallel to the optical axis of the projection optical system 3. The X-axis direction and Y-axis direction are directions perpendicular to each other within a plane perpendicular to the optical axis of the projection optical system 3. The upper surface of the substrate 2 includes a first surface Pa in a region except for a recessed portion, and a second surface Pc of the recessed portion located below the first surface. The surface position measurement device 6 includes a first measurement device 7 configured to measure the surface position of the first surface Pa, and a second measurement device 8 configured to detect the surface position of the second surface Pc.

The first measurement device 7 configured to detect the surface position of the first surface Pa will be described in detail. The first measurement device 7 includes an AF light source 10, a collector lens 11, a slit 12, projection lenses 13 and 15, reflecting mirrors 14 and 17, light receiving lenses 16 and 18, and a detector 19. Detection light L1 emitted by the AF light source 10 uniformly illuminates the slit 12 via the collector lens 11. The detection light L1 having passed through the slit 12 enters the first surface Pa of the substrate 2 via the projection lenses 13 and 15 and the reflecting mirror 14. Building components from the AF light source 10 to the projection lens 15 in the first measurement device 7 constitute a light projecting unit which projects light to the first surface Pa. Building components from the light receiving lens 16 to the detector 19 in the first measurement device 7 constitute a light receiving unit which receives light reflected by the first surface Pa. The light projecting unit and light receiving unit of the first measurement device 7 are positioned on opposite sides with respect to the projection optical system 3 in a direction perpendicular to the first direction in order to measure the surface position of the substrate surface immediately below the projection optical system 3 by the first measurement device 7. As the pattern (opening) of the slit 12, a slit pattern having a short side of about 5 to 50 μm and a long side of about 0.3 to 3 mm is used. A method of illuminating the first surface Pa with a spot beam to obtain an imaging position on a predetermined surface, instead of projecting a slit pattern, is also applicable.

A first angle (first incident angle) $\theta 1$ of the light L1 projected by the first measurement device 7 with respect to a direction (first direction) parallel to the optical axis of the projection optical system 3 is 70° or more. In general, by setting $\theta 1 = 75$ to 85°, light reflected by the first surface Pa such as the surface of a photoresist film can become dominant, and the intensity of light reflected by the substrate main body can be decreased. Accordingly, the projection optical system 3 can be focused on the first surface Pa more accurately. The image of the slit 12 is reduced by the projection lens 15, and formed near a position at which the optical axis of the projection optical system 3 crosses the first surface Pa.

The detection light L1 reflected by the first surface Pa passes through the light receiving lens 16, is reflected by the reflecting mirror 17 to deflect its optical path, and enters the detector 19 through the light receiving lens 18. The slit imaging position on the first surface Pa and the light receiving surface of the detector 19 have a conjugate relationship, and the image of the slit 12 is formed on the detector 19. The detector 19 can detect the amount of detection light L1 incident on the light receiving surface, and generates a measurement signal corresponding to a shift amount arising from the level and inclination angle of the first surface Pa. The controller 9 controls at high accuracy the surface position and inclination angle of the first surface Pa of the substrate 2 by the substrate stage 1 based on the detection signal from the detector 19.

The second measurement device 8 configured to detect the surface position of the second surface Pc is arranged to measure the surface position of the second surface Pc serving as the exposure target region even when a region having a step exists in the exposure target region. A second angle (second incident angle) $\theta 2$ of light L2 projected by the second measurement device 8 with respect to the first direction is, for example, 15° or less. The second measurement device 8 has the same arrangement as that of the first measurement device 7 except that the incident angle is smaller than that in the first measurement device 7, so a description of the arrangement will be omitted. The second measurement device 8 is arranged at a position shifted from the optical axis of the projection optical system 3. This is because the first measurement device 7 and projection optical system 3 are arranged near a position at which the optical axis of the projection optical system 3 crosses the substrate surface. It is substantially difficult to make the slit imaging position of the second measurement device 8 coincide with the optical axis of the projection optical system 3 because this puts severe restrictions on the arrangement of the first measurement device 7 or projection optical system 3.

Figure 2:
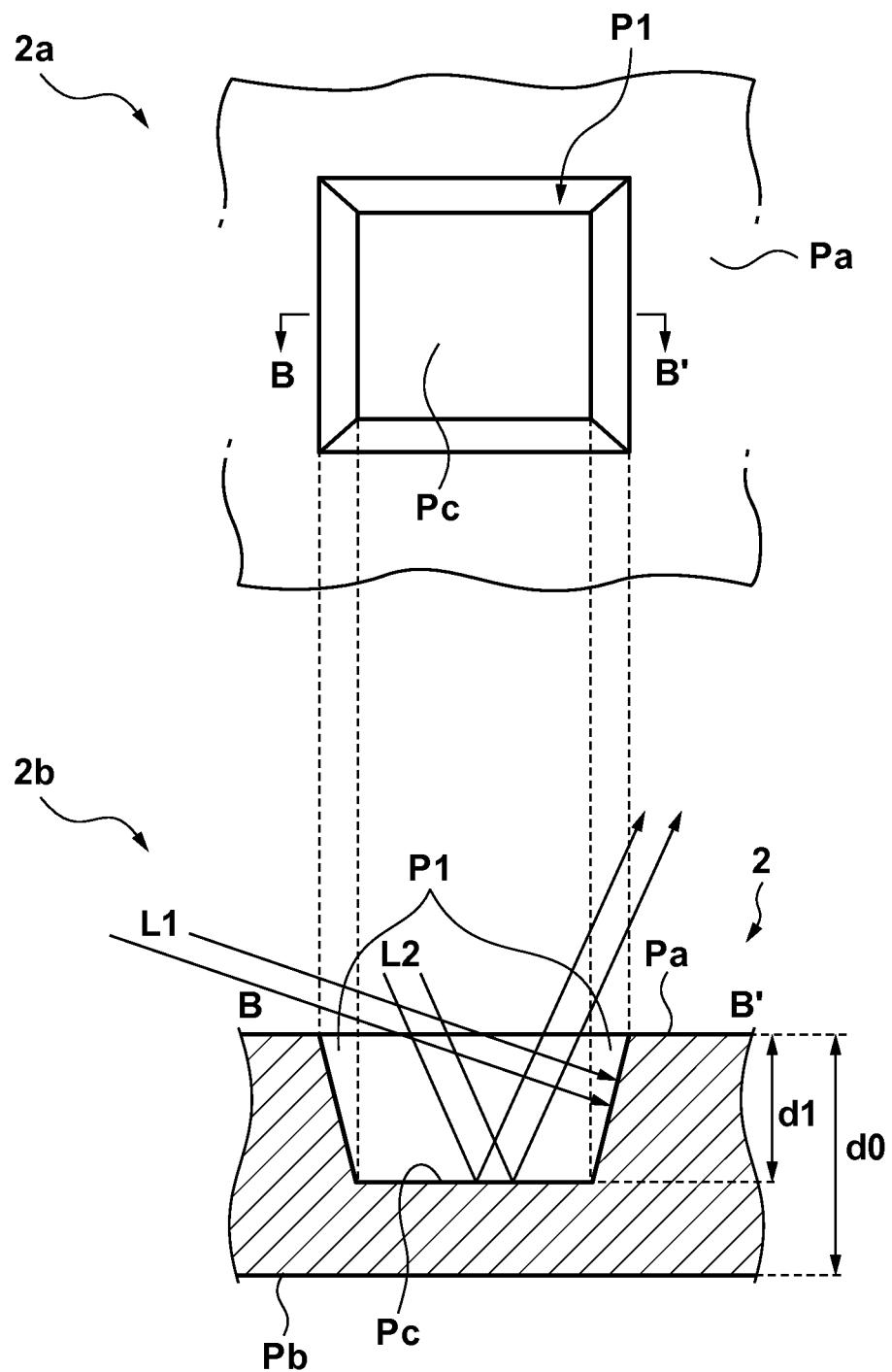
FIG. 2 is a view showing an example of a structure on a substrate according to the first embodiment.

In FIG. 2 shows an example of the structure P1 on the substrate according to the first embodiment. The upper portion 2a is a plan view and the lower portion 2b is a sectional view taken along a line B-B' in 2a. The structure P1 in the first embodiment includes a recessed portion which is sloped toward the outside of the substrate 2. The structure P1 may include a projecting portion at the periphery of the recessed portion. The upper surface (second surface) Pc of the recessed portion has a step amount d1 with respect to the upper surface (first surface) Pa of the substrate 2 except for the recessed portion. The substrate 2 has a thickness d0 of, for example, 0.1 mm (inclusive) to 10 mm (inclusive). The step amount d1 is, for example, $1/10$ (inclusive) to $9/10$ (inclusive) of the thickness d0. The outer shape of the recessed portion of the structure P1 in the first embodiment is almost square. The outer shape of the recessed portion of the structure P1 is appropriately selected from shapes each having a contour defined by a closed curve, such as a polygon, an ellipse (including a circle), and a shape obtained by rounding the corners of a polygon. The internal dimension (aperture) of the recessed portion may be, for example, 2 mm or less, or 1 mm or less. When a minimum rectangle in which the contour of a structure is fitted is assumed, the internal dimension of the recessed portion may be defined by the length of the short side of the rectangle.

In the first embodiment, the incident angle $\theta 2$ of the detection light L2 of the second measurement device 8 is set to be equal to or smaller than 15° in order to cope with an uneven microstructure having a high aspect ratio. For example, assume that the thickness d0 of the substrate 2 is 1 mm, the step amount d1 is 0.9 mm, the internal dimension (aperture) of the recessed portion is 1 mm, and the exposure target surface, that is, focusing target surface includes the upper surface (second surface) Pc of the structure P1. Also, assume that the size of the slit pattern projected on the substrate surface is about 0.5 mm. In this case, the incident angle condition for forming the image of a slit 22 on a detector 27 via the second surface Pc is $\theta 2 \leq \tan^{-1}\{(1-0.5)/2/0.9\}=15.5°$. The detection light L1 of the first measurement device 7 having the first incident angle $\theta 1$ of 70° or more is reflected by the structure P1 and cannot form a slit image, as shown in (b) of FIG. 2. However, the detection light L2 of the second measurement device 8 can form a slit image via the second surface Pc on the detector 27.

Since the incident angle $\theta 2$ of the detection light L2 is small, not only light reflected by the photoresist surface, but also light reflected by the substrate main body is detected. To accurately focus the projection optical system 3 on the second surface Pc, a shift amount from an accurate in-focus position is corrected in advance by exposure evaluation or the like. For example, exposure is performed while changing the Z-coordinate condition of the substrate stage 1. A Z-coordinate when the exposure result is best is regarded as a state in which the projection optical system 3 is focused on the second surface Pc. A detection signal at this time is obtained in advance. Even if the second surface Pc having a step exists on the substrate surface, the controller 9 according to the first embodiment can focus the projection optical system 3 on the exposure target surface by using the first measurement device 7 configured to measure the surface position of the first surface Pa, and the second measurement device 8 configured to measure the surface position of the second surface Pc. The exposure apparatus EX according to the first embodiment can expose the exposure target region in the in-focus state.

Figure 3:
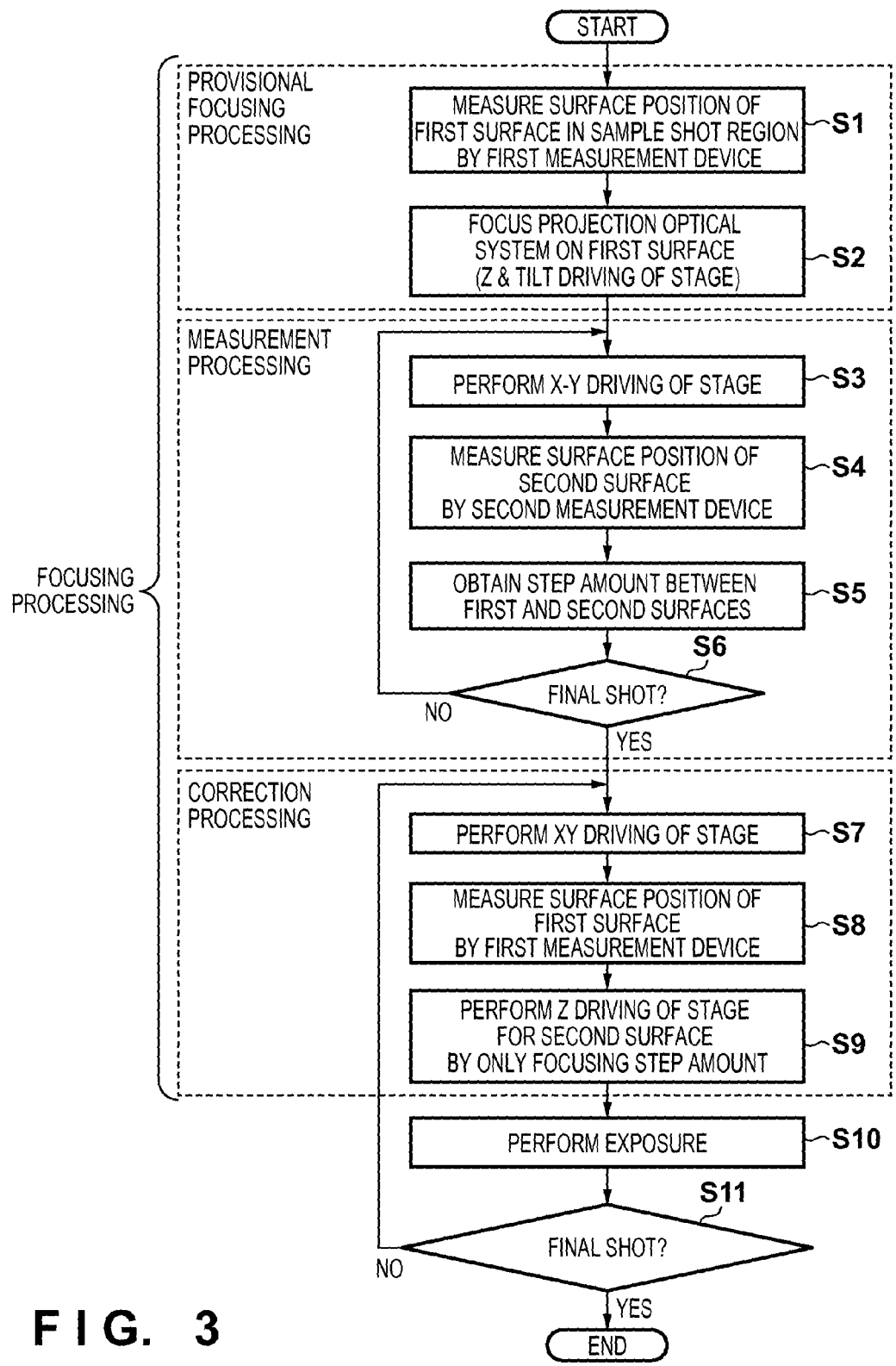
FIG. 3 is a flowchart showing an exposure method according to the first embodiment.

An example of an exposure method including a focusing method according to the first embodiment will be explained with reference to the flowchart of FIG. 3. The first embodiment assumes that the exposure target surface is the second surface Pc. In the first embodiment, focusing processing is performed before performing exposure processing. The focusing processing in the first embodiment includes provisional focusing processing (steps S1 and S2), measurement processing (steps S3 to S6), and correction processing (steps S7 to S9). In steps S1 and S2 in which provisional focusing processing is performed, the controller 9 focuses the projection optical system 3 on the first surface Pa by using the first measurement device 7. In steps S3 to S6 in which measurement processing is performed, the controller 9 obtains information about the step amount between the second surface Pc serving as the exposure target surface and the first surface Pa by using the second measurement device 8. In steps S7 to S9 in which correction processing is performed, the controller 9 moves the second surface Pc to the position of the first surface Pa based on the step amount obtained in step S5 from the state in which the projection optical system 3 is focused on the first surface Pa by using the first measurement device 7.

The exposure apparatus EX performs focusing processing and exposure processing by controlling the respective units by the controller 9. When performing provisional focusing processing, measurement processing, and correction processing, the controller 9 controls the respective units of the exposure apparatus EX in accordance with a program for executing control of the respective units operating in the respective processes.

In the first embodiment, the exposure processing surface, that is, the focusing target surface in exposure processing is the second surface Pc, and the first surface Pa is the upper surface of the substrate 2 except for the second surface. Since the first surface Pa is a surface in a region where the entire image of the slit 12 can be projected, the projection optical system 3 can be focused on the first surface Pa at high accuracy.

Figure 4A:
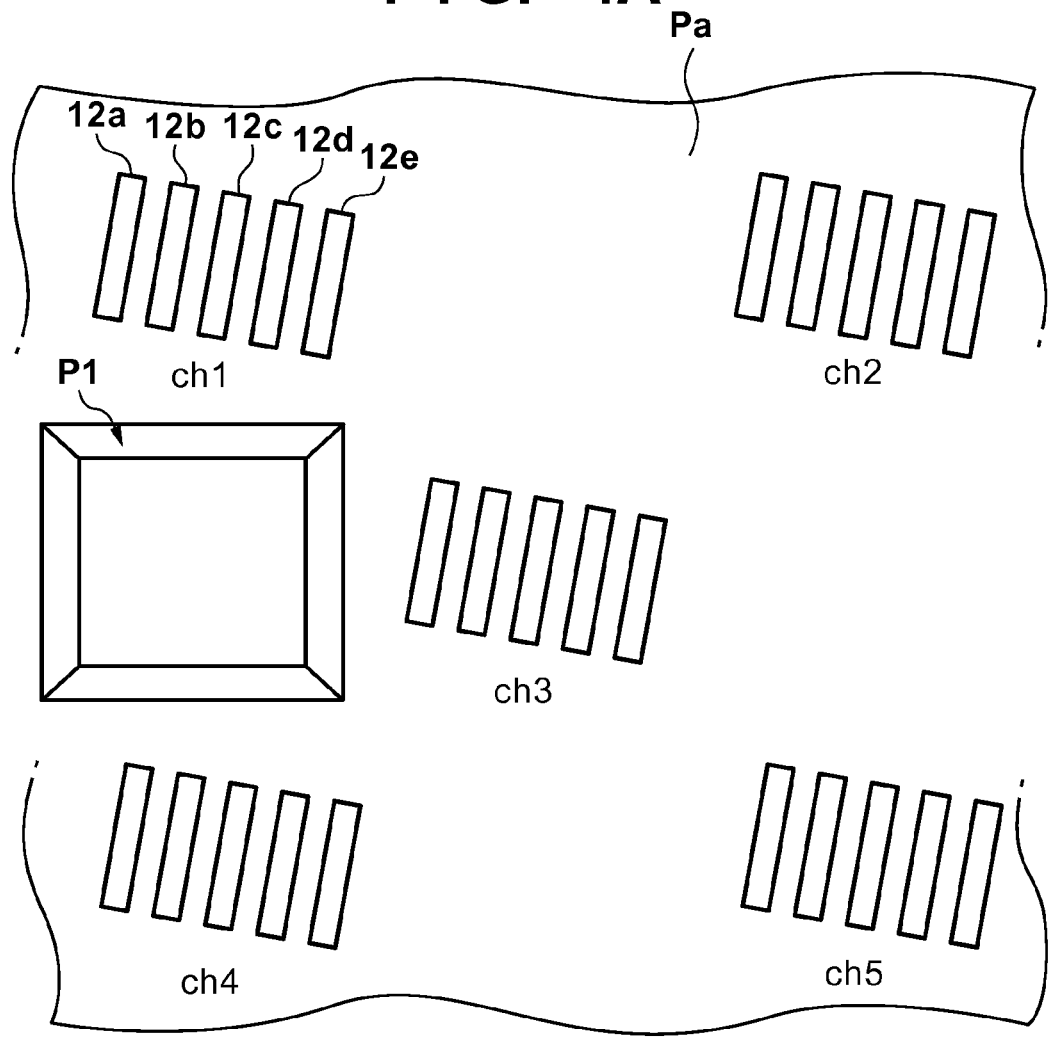
FIGS. 4A and 4B are plan views showing an example of a slit image according to the first embodiment.

FIG. 4A is a plan view schematically showing an example of a slit image detected by the first measurement device 7 in step S1 in order to control the position of the substrate stage 1 by the controller 9 in provisional focusing processing. Based on the detection results of images 12a to 12e of the slit 12 at a plurality of projection positions ch1 to ch5 different from each other on the substrate surface, the controller 9 obtains, at each projection position, the Z-coordinate of the substrate stage 1 when the projection optical system 3 is focused on the first surface Pa. When the region where the entire image of the slit 12 can be projected is narrow, it is also possible to calculate an approximate plane from measurement data of an arbitrary projection position out of the projection positions ch1 to ch5.

According to the first embodiment, in step S1, the first measurement device 7 measures the surface position of the first surface Pa in a sample shot region (first step). In step S2, the controller 9 calculates the approximate plane of the first surface Pa based on the measurement result in step S1 by a method such as least squares approximation, obtaining a condition that the projection optical system 3 is focused on the approximate plane of the first surface Pa (third step). The controller 9 drives the substrate stage 1 in the Z direction to satisfy the in-focus condition (sixth step).

Provisional focusing processing may be performed for one of a plurality of substrates 2, and the obtained estimated value may be used as a value common to a plurality of substrates 2. That is, by using the Z-coordinate and inclination angle of the substrate stage 1 that are obtained from one substrate 2 to focus the projection optical system 3 on the substrate surface, the projection optical system 3 may be focused on the substrate surface of another substrate 2.

In step S3, the controller 9 drives the substrate 2 in the X and Y directions by using the substrate stage 1 while holding the corrected Z position and inclination angle of the first surface Pa. Then, in step S4, the controller measures the surface position of the second surface Pc of each shot region by using the second measurement device 8 (second step).

Since the Z position and inclination angle of the first surface Pa are corrected in advance at high accuracy, the measurement range of surface position measurement by the second measurement device 8 can be narrowed, and the measurement accuracy can be improved. The first measurement device 7 and second measurement device 8 are positioned apart from each other in the X and Y directions on the substrate. For this reason, the substrate surface fluctuates in the Z-coordinate direction upon driving the substrate stage 1 under the influence of the flatness or deformation of the stage base plate. Hence, fluctuations of the substrate stage 1 in the Z-coordinate direction with respect to the X and Y positions are measured in advance, and the measurement data is saved in a memory as a table which associates the measurement data with the Z-coordinate of the substrate stage 1. When the substrate stage 1 is driven to the position of the second measurement device 8, the controller 9 performs correction driving for the Z-coordinate of the substrate stage 1 by using the table in the memory.

Figure 4B:
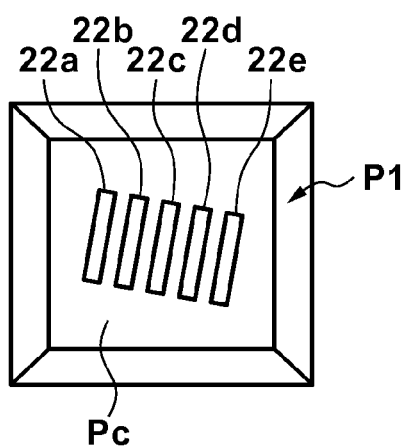

FIG. 4B is a plan view schematically showing an example of the image of the slit 22 of the second measurement device 8 that is projected on the second surface Pc when the position of the substrate stage 1 is controlled in measurement processing. In step S4, the controller 9 measures the surface position of the second surface Pc based on detection results of detecting, by the detector 27, images 22a to 22e of the slit 22 projected to one position on the second surface Pc. In step S5, the controller 9 obtains the step amount between the first surface Pa and the second surface Pc by obtaining the difference between the surface position of the first surface Pa and the surface position of the second surface Pc (fourth step). The controller 9 then stores information about the step amount in a storage unit. The processes in steps S4 and S5 are repetitively executed for all target shot regions on a designated substrate (step S6).

In correction processing, first, in step S7, the controller 9 drives the substrate 2 to the exposure region by using the substrate stage 1. In step S8, the controller 9 projects the image of the slit 12 of the first measurement device 7 onto the substrate surface and obtains, from the detection result of the image by the detector 19, the Z-coordinate of the substrate stage 1 at which the projection optical system 3 is focused on the first surface Pa. After that, in step S9, the controller 9 controls the position of the substrate stage 1 based on the step amount between the first surface Pa and the second surface Pc so that the projection optical system 3 is focused on the second surface Pc (fifth step). The controller 9 reads out, from the memory, the information representing the step amount between the first surface Pa and the second surface Pc. The controller 9 controls the position of the substrate stage 1 so that the substrate stage 1 comes close to the projection optical system 3 by only the step amount from the state in which the projection optical system 3 is focused on the first surface Pa. That is, the controller 9 obtains, by using the step amount, the Z-coordinate of the substrate stage 1 at which the projection optical system 3 is focused on the second surface Pc serving as the focusing target surface. After performing correction processing in steps S7 to S9, the controller 9 performs exposure processing in one target shot region, and repetitively executes correction processing and exposure processing in steps S7 to S10 in all shot regions on the substrate.

When the structure P1 is a projecting portion and the projection optical system 3 is to be focused on the vertex, it suffices to control the substrate stage 1 so that the substrate stage 1 moves apart from the projection optical system 3 by only the step amount between the vertex and the substrate surface from the state in which the projection optical system 3 is focused on the substrate surface except for the projecting portion.

In the first embodiment, the step amount between the first surface Pa and the second surface Pc is obtained in each shot region. However, it is also possible to obtain step amounts in some shot regions out of a plurality of shot regions, and obtain the distribution of step amounts in the X and Y directions by, for example, function approximation of the step amounts in these shot regions, thereby obtaining information about the step amount.

Second Embodiment

Figure 5:
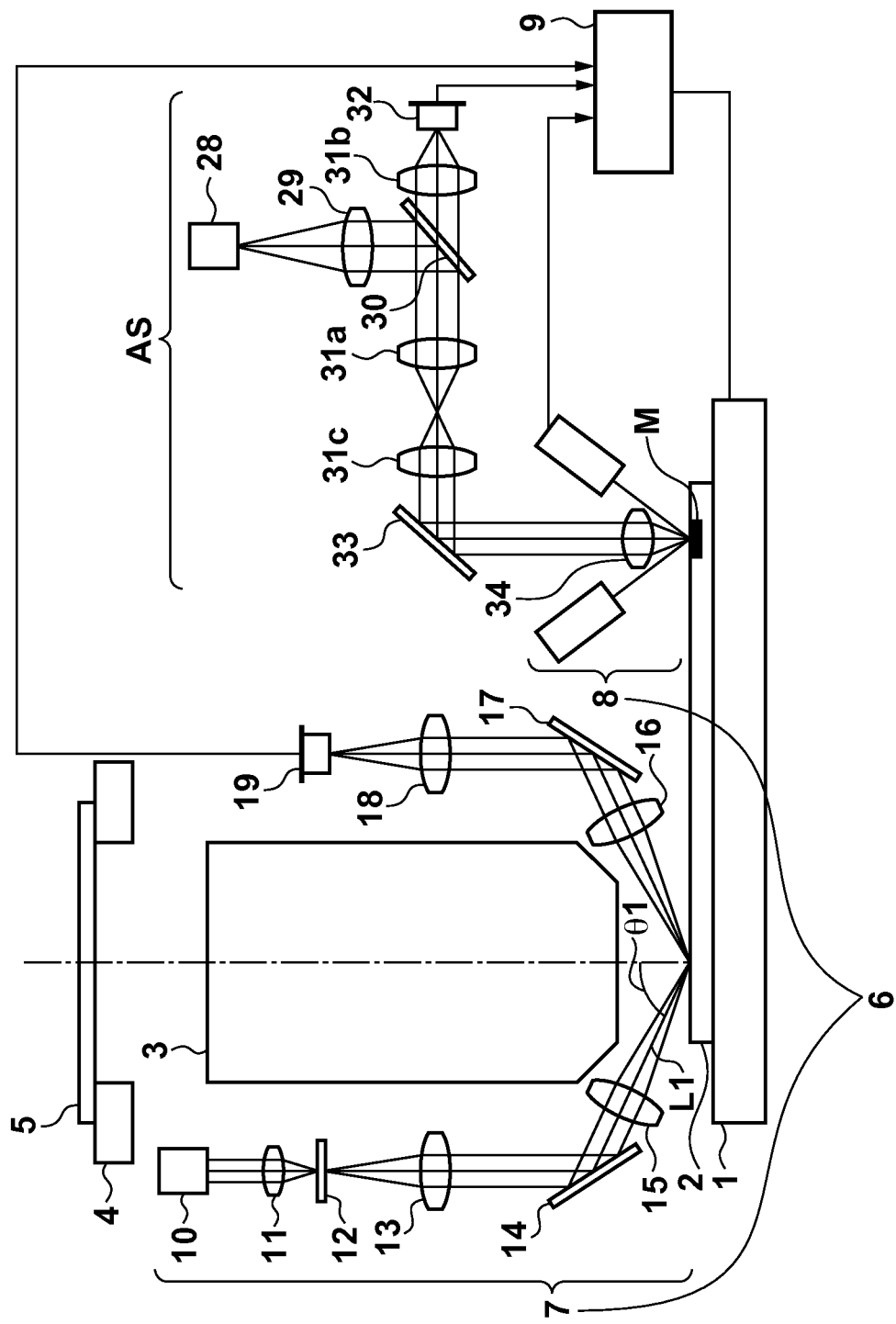
FIG. 5 is a view showing an exposure apparatus according to the second embodiment.

Next, FIG. 5 shows the second embodiment of the present invention. The same reference numerals as those in FIG. 1 denote the same functions. As in the first embodiment, the second embodiment will explain a case in which the surface position of a second surface Pc is measured when a region having the second surface Pc exists in the exposure target region. The second embodiment is different from the first embodiment in that the arrangement includes an alignment detector AS. In the second embodiment, mapping of the position of the second surface, and global alignment for obtaining information about the array of shot regions can be executed simultaneously.

The building components of the alignment detector AS will be described in detail. The alignment detector AS includes an illumination light source 28 for the alignment detector AS, and optical systems such as an objective lens 34. The illumination light source 28 emits light of a wide wavelength band using a halogen lamp or the like, or monochromatic light using an He—Ne laser or the like. Illumination light emitted by the illumination light source 28 is reflected by a half mirror 30 via an illumination system lens 29, and enters an imaging lens preceding group 31a. The illumination light is further reflected by a reflecting mirror 33 via a relay lens 31c, and enters an objective lens 34. The illumination light converged by the objective lens 34 illuminates an alignment mark M on a substrate 2 positioned in an observable range.

Light reflected and scattered by the alignment mark M is reflected by the reflecting mirror 33 via the objective lens 34, and then enters the relay lens 31c. Further, the reflected and scattered light passes through the half mirror 30 via the imaging lens preceding group 31a, is converged by an imaging lens succeeding group 31b, and forms the image of the alignment mark M on the image sensing surface of an image sensor 32 such as a CCD (Charge Coupled Device). The image sensor 32 sends, to a controller 9, an output signal representing the image of the alignment mark M formed on the image sensing surface. The controller 9 performs signal processing on the output signal from the image sensor 32 to detect the position of the alignment mark M on the substrate 2 and obtain array information of shot regions formed on the substrate. The controller 9 drives a substrate stage 1 based on this shot region array information by using a stage driving mechanism (not shown), and moves the substrate 2 to the exposure region of a projection optical system 3.

Figure 6:
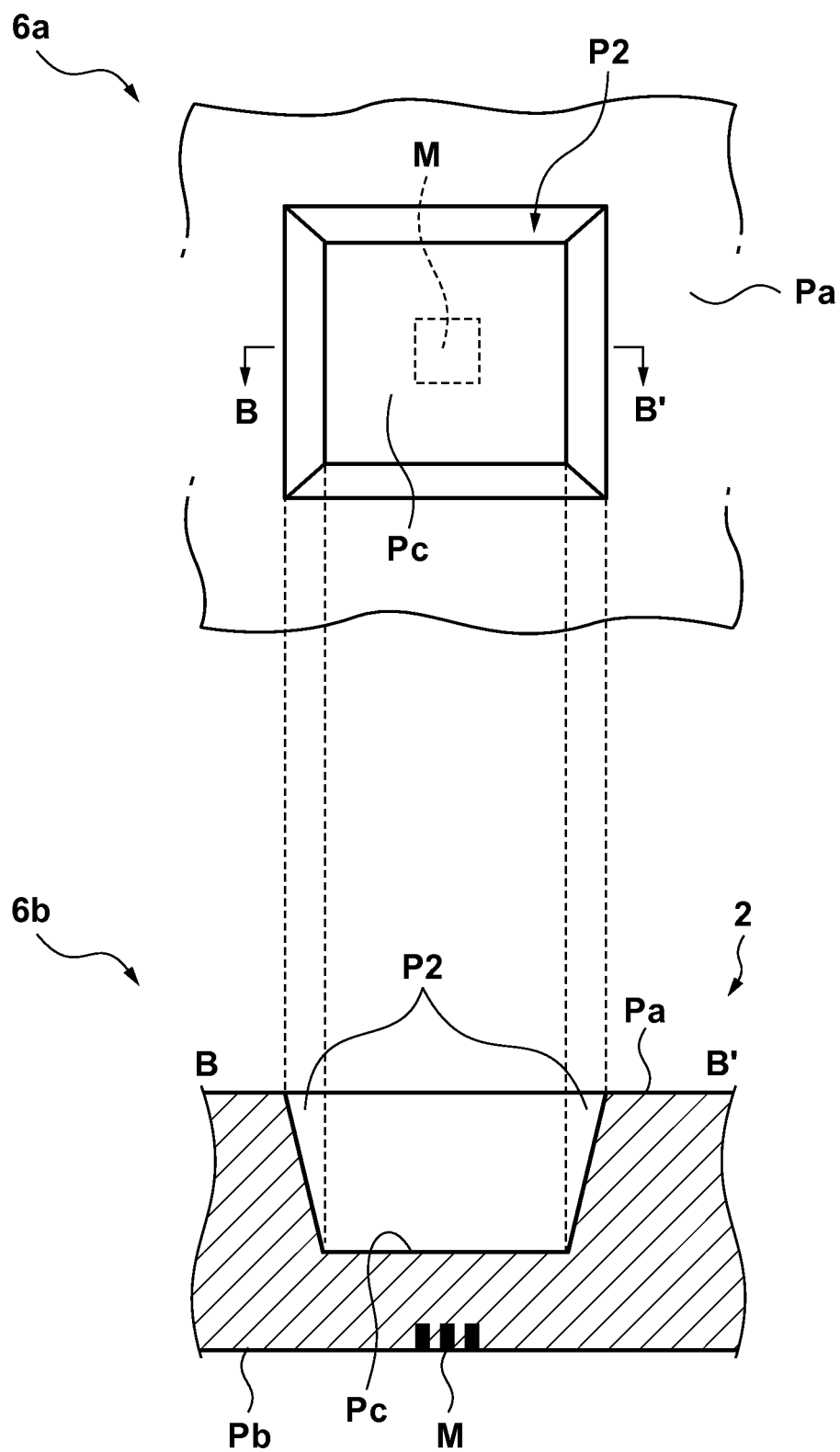
FIG. 6 is a view showing an example of a structure on a substrate according to the second embodiment.

In FIG. 6 shows an example of a structure P2 on the substrate according to the second embodiment. The upper portion 6a is a plan view and the lower portion 6b is a sectional view taken along a line B-B' in 6a. The structure P2 in the second embodiment includes the alignment mark M on a bottom surface Pb in the region of the recessed portion. An example of an exposure method according to the second embodiment will be explained. Focusing processing in the second embodiment also performs processing of provisionally focusing the projection optical system 3 on a first surface Pa by using a first measurement device 7, processing of obtaining the step amount between a second surface Pc and the first surface Pa of the structure P2 by using a second measurement device 8, and correction processing of moving the second surface Pc to the surface position of the first surface Pa based on the step amount.

In measurement processing after provisional focusing processing, the controller 9 measures the surface position of the second surface Pc by using the second measurement device 8, and calculates the step amount between the first surface Pa and the second surface Pc. The controller 9 obtains the step amount between the first surface Pa and the second surface Pc from the results of provisional focusing processing and measurement processing. The controller 9 stores information about the step amount in a memory.

Figure 7:
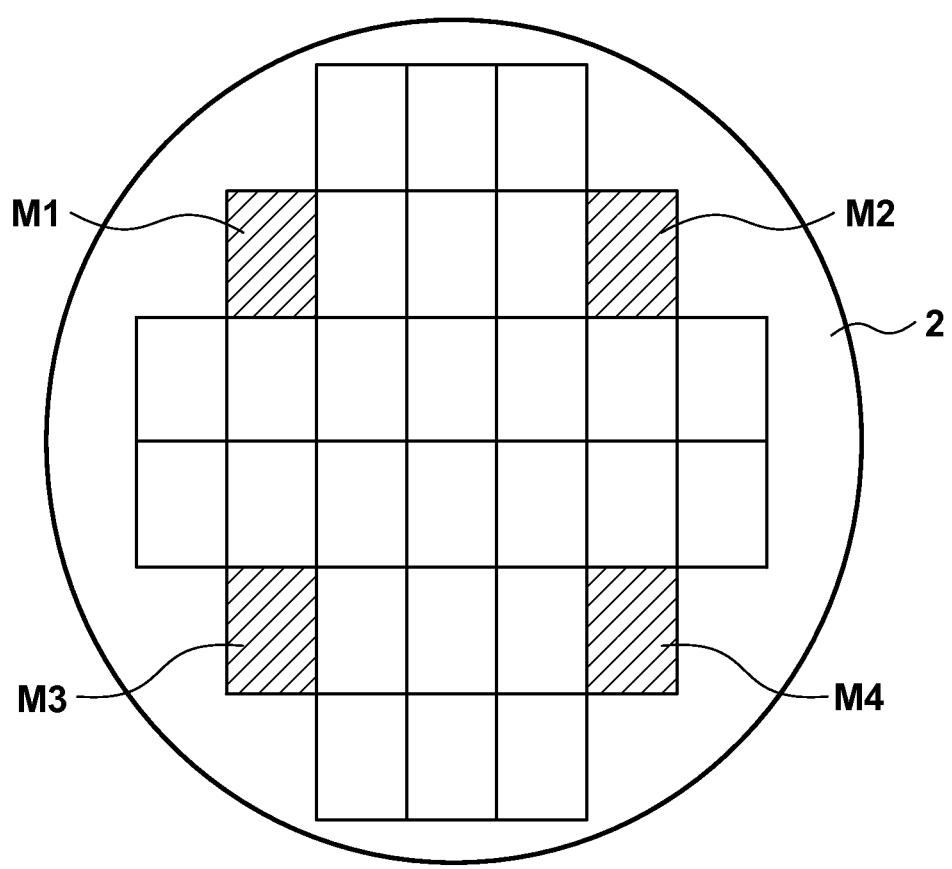
FIG. 7 is a view showing the arrangement of alignment measurement points in exposure shot regions according to the second embodiment.

Measurement by the second measurement device to obtain the step amount can be executed at the same time as alignment measurement at, for example, alignment mark positions M1 to M4 in four shot regions hatched in FIG. 7. The measurement spans in the X and Y directions are desirably widened to improve the accuracy of the rotation angle in the θ direction in the measured alignment marks M1 to M4. To achieve this, shot regions near the periphery of the substrate 2 are generally set as the four shot regions.

In some cases, the alignment mark M is close to the second surface Pc, and the entire image of the slit pattern of the second measurement device 8 cannot be projected onto the second surface Pc. In such a case, after the alignment mark M is observed by the alignment detector AS, the substrate stage 1 is driven in a small amount so that the entire image of the slit pattern is projected onto the second surface Pc. In correction processing, the controller 9 moves the substrate 2 based on shot region array information obtained in alignment measurement. Then, based on the surface position measurement result of the first surface Pa by the first measurement device 7, the controller 9 obtains the Z-coordinate of the substrate stage 1 at which the projection optical system 3 is focused on the first surface Pa.

Thereafter, the controller 9 controls the position of the substrate stage 1 so that the substrate stage 1 comes close to the projection optical system 3 by only the step amount between the first surface Pa and the second surface Pc from the state in which the projection optical system 3 is focused on the first surface Pa. As described above, according to the second embodiment, the surface position of the second surface Pc serving as the focusing target region can be measured at the same time as alignment measurement. The second embodiment can increase the throughput in addition to the effects of the first embodiment.

[Device Manufacturing Method]

A method of manufacturing a device (for example, a semiconductor device or liquid crystal display device) will be explained. The device is manufactured through a pre-process of forming an integrated circuit on a wafer, and a post-process of completing, as a product, an integrated circuit chip formed on the wafer formed by the pre-process. The pre-process includes a step of exposing a wafer coated with a photosensitive agent by using the above-mentioned exposure apparatus, and a step of developing the wafer. The post-process includes an assembly step (dicing and bonding) and a packaging step (encapsulation). The liquid crystal display device is manufactured through a process of forming a transparent electrode. The process of forming a transparent electrode includes a step of applying a photosensitive agent to a glass substrate on which a transparent conductive film is deposited, a step of exposing the glass substrate coated with the photosensitive agent by using the above-described exposure apparatus, and a step of developing the glass substrate. According to the method of manufacturing a device in the embodiment, a higher-quality device than a conventional one can be manufactured.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-118306, filed Jun. 4, 2013, which is hereby incorporated by reference herein in its entirety.

What is claimed is:

1. A method of focusing an optical system on a second surface of a target object having an upper surface including a first surface and the second surface located below the first surface, wherein the target object has a step between the first surface and the second surface, the apparatus comprising:

a first step of projecting oblique incidence light to the first surface at a first incident angle which forms a first angle with respect to a first direction parallel to an optical axis of the optical system, and receiving the light reflected by the first surface to measure a surface position of the first surface;

a second step of projecting oblique incidence light to the second surface at a second incident angle which forms a second angle smaller than the first angle with respect to the first direction, and receiving the light reflected by the second surface to measure a surface position of the second surface, wherein the second incident angle is determined so as to prevent the light reflected by the second surface from being reflected by the step between the first surface and the second surface;

a third step of obtaining, based on a measurement result of the surface position of the first surface, an in-focus condition in which the optical system is focused on the first surface;

a fourth step of obtaining information about a step amount between the first surface and the second surface based on the measurement result of the surface position of the first surface and a measurement result of the surface position of the second surface; and a fifth step of focusing the optical system on the second surface based on the in-focus condition and the information about the step amount.

2. The method according to claim 1, further comprising a sixth step of, after executing the first step and the third step, moving the target object in the first direction to focus the optical system on the first surface based on the in-focus condition obtained in the third step, wherein while a position, in the first direction, of the target object which satisfies the in-focus condition is held in the sixth step, the second step is executed and then the fourth step is executed, and in the fifth step, the target object which satisfies the in-focus condition is moved by only the step amount in the first direction.

3. The method according to claim 1, wherein the first surface is set to surround the second surface.

4. The method according to claim 1, wherein the first angle is not smaller than 70°, and the second angle is not larger than 15°.

5. The method according to claim 1, wherein a first oblique incidence surface position measurement device configured to measure the surface position of the first surface includes a light projecting unit configured to project light to the first surface, and a light receiving unit configured to receive light reflected by the first surface, the light projecting unit and the light receiving unit are positioned on opposite sides with respect to the optical system in a direction perpendicular to the first direction, and a second oblique incidence surface position measurement device configured to measure the surface position of the second surface is arranged at a position shifted from the optical axis of the optical system.

6. The method according to claim 1, wherein the target object has a step between the first surface and the second surface and the second angle is determined so as to prevent the projecting light at the second incident angle from being reflected by the step between the first surface and the second surface.

7. An apparatus for focusing an optical system on a second surface of a target object having an upper surface including a first surface and the second surface located below the first surface, wherein the target object has a step between the first surface and the second surface, the apparatus comprising:

a first oblique incidence surface position measurement device configured to project light to the first surface at a first incident angle which forms a first angle with respect to a first direction parallel to an optical axis of the optical system, and receive the light reflected by the first surface, thereby measuring a surface position of the first surface;

a second oblique incidence surface position measurement device configured to project light to the second surface at a second incident angle which forms a second angle smaller than the first angle with respect to the first direction, and receive the light reflected by the second surface, thereby measuring a surface position of the second surface, wherein the second incident angle is determined so as to prevent the light reflected by the second surface from being reflected by the step between the first surface and the second surface; and a controller configured to obtain, based on a measurement result of the surface position of the first surface, an in-focus condition in which the optical system is focused on the first surface, obtain information about a step amount between the first surface and the second surface based on the measurement result of the surface position of the first surface and a measurement result of the surface position of the second surface, and focus the optical system on the second surface based on the in-focus condition and the information about the step amount.

8. The apparatus according to claim 7, wherein the first angle is not smaller than 70°, and the second angle is not larger than 15°.

9. A method of projecting a pattern of a mask to each of a plurality of shot regions on a substrate via a projection optical system to expose the substrate, each of the plurality of shot regions having an upper surface including a first surface and a second surface located below the first surface, wherein each of the plurality of shot regions has a step between the first surface and the second surface, the method comprising:

a first step of projecting oblique incidence light to the first surface at a first incident angle which forms a first angle with respect to a first direction parallel to an optical axis of the projection optical system, and receiving the light reflected by the first surface to measure a surface position of the first surface;

a second step of projecting oblique incidence light to the second surface at a second incident angle which forms a second angle smaller than the first angle with respect to the first direction, and receiving the light reflected by the second surface to measure a surface position of the second surface, wherein the second incident angle is determined so as to prevent the light reflected by the second surface from being reflected by the step between the first surface and the second surface;

a third step of obtaining, based on a measurement result of the surface position of the first surface, an in-focus condition in which the projection optical system is focused on the first surface;

a fourth step of obtaining information about a step amount between the first surface and the second surface based on the measurement result of the surface position of the first surface and a measurement result of the surface position of the second surface;

a fifth step of focusing the projection optical system on the second surface based on the in-focus condition and the information about the step amount; and a sixth step of exposing the second surface of the target shot region on which the projection optical system is focused in the fifth step.

10. The method according to claim 9, wherein in the third step, the surface positions of the second surfaces of a portion of shot regions out of the plurality of shot regions are measured, and in the fourth step, a step amount of the second surface of the target shot region is estimated using measurement results of the surface positions of the second surfaces of the portion of shot regions.

11. The method according to claim 9, wherein alignment marks are arranged in regions where the second surfaces of a portion of shot regions out of the plurality of shot regions exist, and the step of focusing the projection optical system on the second surface of the target shot region includes a step of measuring the alignment marks and obtaining information about an array of the shot regions based on measurement results of the alignment marks.

12. The method according to claim 9, wherein the first angle is not smaller than 70°, and the second angle is not larger than 15°.

13. A method of manufacturing a device, the method comprising:
- an exposure step of projecting a pattern of a mask to each of a plurality of shot regions on a substrate via a projection optical system to expose the substrate;
- a step of developing the exposed substrate; and
- a step of processing the developed substrate to manufacture the device,
- wherein each of the plurality of shot regions has an upper surface including a first surface and a second surface located below the first surface,
- wherein each of the plurality of shot regions has a step between the first surface and the second surface, and
- wherein the exposure step includes:
- a first step of projecting oblique incidence light to the first surface at a first incident angle which forms a first angle with respect to a first direction parallel to an optical axis of the projection optical system, and receiving the light reflected by the first surface to measure a surface position of the first surface;
- a second step of projecting oblique incidence light to the second surface at a second incident angle which forms a second angle smaller than the first angle with respect to the first direction, and receiving the light reflected by the second surface to measure a surface position of the second surface, wherein the second incident angle is determined so as to prevent the light reflected by the second surface from being reflected by the step between the first surface and the second surface;
- a third step of obtaining, based on a measurement result of the surface position of the first surface, an in-focus condition in which the projection optical system is focused on the first surface;
- a fourth step of obtaining information about a step amount between the first surface and the second surface based on the measurement result of the surface position of the first surface and a measurement result of the surface position of the second surface;
- a fifth step of focusing the projection optical system on the second surface based on the in-focus condition and the information about the step amount; and
- a sixth step of exposing the second surface of the target shot region on which the projection optical system is focused in the fifth step.

14. The method according to claim 13, wherein the first angle is not smaller than 70°, and the second angle is not larger than 15°.

15. A method of focusing an optical system on a second surface of a target object having an upper surface including a first surface and the second surface located below the first surface, comprising:
- a first step of projecting light to the first surface at a first incident angle which forms a first angle with respect to a first direction parallel to an optical axis of the optical system, and receiving the light reflected by the first surface to measure a surface position of the first surface, wherein the first angle is not smaller than 70°;
- a second step of projecting light to the second surface at a second incident angle which forms a second angle smaller than the first angle with respect to the first direction, and receiving the light reflected by the second surface to measure a surface position of the second surface, wherein the second angle is not larger than 15°;
- a third step of obtaining, based on a measurement result of the surface position of the first surface, an in-focus condition in which the optical system is focused on the first surface;
- a fourth step of obtaining information about a step amount between the first surface and the second surface based on the measurement result of the surface position of the first surface and a measurement result of the surface position of the second surface; and
- a fifth step of focusing the optical system on the second surface based on the in-focus condition and the information about the step amount.

16. An apparatus for focusing an optical system on a second surface of a target object having an upper surface including a first surface and the second surface located below the first surface, comprising:
- a first measurement device configured to project light to the first surface at a first incident angle which forms a first angle with respect to a first direction parallel to an optical axis of the optical system, and receive the light reflected by the first surface, thereby measuring a surface position of the first surface, wherein the first angle is not smaller than 70°;
- a second measurement device configured to project light to the second surface at a second incident angle which forms a second angle smaller than the first angle with respect to the first direction, and receive the light reflected by the second surface, thereby measuring a surface position of the second surface, wherein the second angle is not larger than 15°; and
- a controller configured to obtain, based on a measurement result of the surface position of the first surface, an in-focus condition in which the optical system is focused on the first surface, obtain information about a step amount between the first surface and the second surface based on the measurement result of the surface position of the first surface and a measurement result of the surface position of the second surface, and focus the optical system on the second surface based on the in-focus condition and the information about the step amount.

17. A method of projecting a pattern of a mask to each of a plurality of shot regions on a substrate via a projection optical system to expose the substrate,
- each of the plurality of shot regions having an upper surface including a first surface and a second surface located below the first surface,
- the method comprising:
- a first step of projecting light to the first surface at a first incident angle which forms a first angle with respect to a first direction parallel to an optical axis of the projection optical system, and receiving the light reflected by the first surface to measure a surface position of the first surface, wherein the first angle is not smaller than 70°;
- a second step of projecting light to the second surface at a second incident angle which forms a second angle smaller than the first angle with respect to the first direction, and receiving the light reflected by the second surface to measure a surface position of the second surface, wherein the second angle is not larger than 15°;
- a third step of obtaining, based on a measurement result of the surface position of the first surface, an in-focus condition in which the projection optical system is focused on the first surface;
- a fourth step of obtaining information about a step amount between the first surface and the second surface based on the measurement result of the surface position of the first surface and a measurement result of the surface position of the second surface;

a fifth step of focusing the projection optical system on the second surface based on the in-focus condition and the information about the step amount; and a sixth step of exposing the second surface of the target shot region on which the projection optical system is focused in the fifth step.

18. A method of manufacturing a device, the method comprising:

an exposure step of projecting a pattern of a mask to each of a plurality of shot regions on a substrate via a projection optical system to expose the substrate;

a step of developing the exposed substrate; and a step of processing the developed substrate to manufacture the device, wherein each of the plurality of shot regions has an upper surface including a first surface and a second surface located below the first surface, wherein the exposure step includes:

a first step of projecting light to the first surface at a first incident angle which forms a first angle with respect to a first direction parallel to an optical axis of the projection optical system, and receiving the light reflected by the first surface to measure a surface position of the first surface, wherein the first angle is not smaller than 70°;

a second step of projecting light to the second surface at a second incident angle which forms a second angle smaller than the first angle with respect to the first direction, and receiving the light reflected by the second surface to measure a surface position of the second surface, wherein the second angle is not larger than 15°;

a third step of obtaining, based on a measurement result of the surface position of the first surface, an in-focus condition in which the projection optical system is focused on the first surface;

a fourth step of obtaining information about a step amount between the first surface and the second surface based on the measurement result of the surface position of the first surface and a measurement result of the surface position of the second surface;

a fifth step of focusing the projection optical system on the second surface based on the in-focus condition and the information about the step amount; and a sixth step of exposing the second surface of the target shot region on which the projection optical system is focused in the fifth step.

* * * * *